INVENTOR.
JOHN P. ULTCHT, DECEASED
ALICE C. ULTCHT, ADMINISTRATRIX
BY
W. J. Shanley, Jr.
HIS ATTORNEY Nov. 15, 1966  J. P. ULTCHT  3,286,178
MEANS FOR MEASURING ACTIVE AND REACTIVE POWER IN A 3-φ, 4-W
DISTRIBUTION SYSTEM, INCLUDING THREE AUTOTRANSFORMERS
INTERCONNECTED TO PROVIDE 2-φ TO 3-φ CONVERSION
Filed Dec. 27, 1962  3 Sheets-Sheet 3

INVENTOR.
JOHN P. ULTCHT, DECEASED
ALICE C. ULTCHT, ADMINISTRATRIX
BY
W. J. Shanley, Jr.
HIS ATTORNEY

United States Patent Office 3,286,178
Patented Nov. 15, 1966

3,286,178
MEANS FOR MEASURING ACTIVE AND REACTIVE POWER IN A 3-Φ, 4-W DISTRIBUTION SYSTEM, INCLUDING THREE AUTOTRANSFORMERS INTERCONNECTED TO PROVIDE 2-Φ TO 3-Φ CONVERSION
John P. Ultcht, deceased, late of Lynn, Mass., by Alice C. Ultcht, administratrix, Lynn, Mass., assignor to General Electric Company, a corporation of New York
Filed Dec. 27, 1962, Ser. No. 247,765
17 Claims. (Cl. 324—107)

This invention relates to electrical measurement devices, and more particularly, to an improved arrangement suitable for use in the measurement of active and reactive power in a three-phase, four-wire power distribution system.

In the control of power distribution systems of the three-phase, four-wire type it is often necessary to measure system active power and system reactive power. It is conventional in the prior art to measure the power of a four-wire, three-phase system by utilizing a two and one-half element wattmeter or varmeter instead of the more expensive three-element meter. The two and one-half element wattmeter of the prior art measures system active power by utilizing two of the three potential inputs and three currents to operate the meter. The more expensive three-element meter, which utilizes three potentials, has generally not been utilized to the same extent that the two and one-half element meter has been utilized due to its greater expense and the fact that the error which might be introduced by utilizing only two potentials is small enough that it can be ignored for the sake of economy.

Recently, a new hook-on watt-var transducer was developed for use with D.-C. recorders. This transducer converts either watts or vars to D.-C. milliamps which are proportional to the watt or var input to the transducer. This makes it possible to use a simple D.-C. milliammeter for the purpose of recording watts or vars instead of the more cumbersome conventional electrodynamic wattmeters or varmeters. This transducer is described and claimed in the copending patent application, Ser. No. 80,077 of Almon J. Corson, filed January 3, 1961, and now Patent No. 3,218,554, entitled "Electrical Instrument Transducer," and assigned to the same assignee as the subject application.

The prior copending Corson application discloses in FIG. 5 a transducer for measuring watts or vars of a single-phase, two-wire system by sensing the voltage on the line as well as the current through the line and multiplying the quantities in a multiplier circuit for obtaining an output current which is proportional to watts or vars. In order to utilize three of such transducers to measure system active or reactive power in a four-wire, three-phase system it is necessary to obtain three potential and three current values. However, due to the general acceptance of the prior art two and one-half element electrodynamic wattmeter, utilities and industrial customers normally have available only two potential transformers coupled up the system. Therefore, to obtain this third potential by installing a third potential transformer would involve considerable expense by way of equipment costs and downtime.

It is therefore an object of this invention to provide an improved system for obtaining three potentials which are representative of the potentials existing in a three-phase, four-wire distribution system by utilizing only two potential transformers connected to the distribution system.

It is another object of this invention to provide a system for obtaining in-phase and 90 degrees out-of-phase potentials for each phase of a three-phase, four-line distribution system by utilizing only two potential transformers connected to the distribution system.

It is a further object of this invention to provide an improved system for measuring active and reactive power in a three-phase, four-wire power distribution system by utilizing two potentials and three currents of the power distribution system.

It is still a further object of this invention to provide a portable electrical instrument of high accuracy for measuring system active and reactive power in multiphase power distribution systems.

Further objects and advantages of the invention will become apparent as the following description proceeds and the features of novelty which characterize the invention will be pointed out with particularity in the claims annexed to and forming a part of this specification.

For a better understanding of this invention, reference may be had to the following description taken in connection with the accompanying drawings in which.

Figure 1:
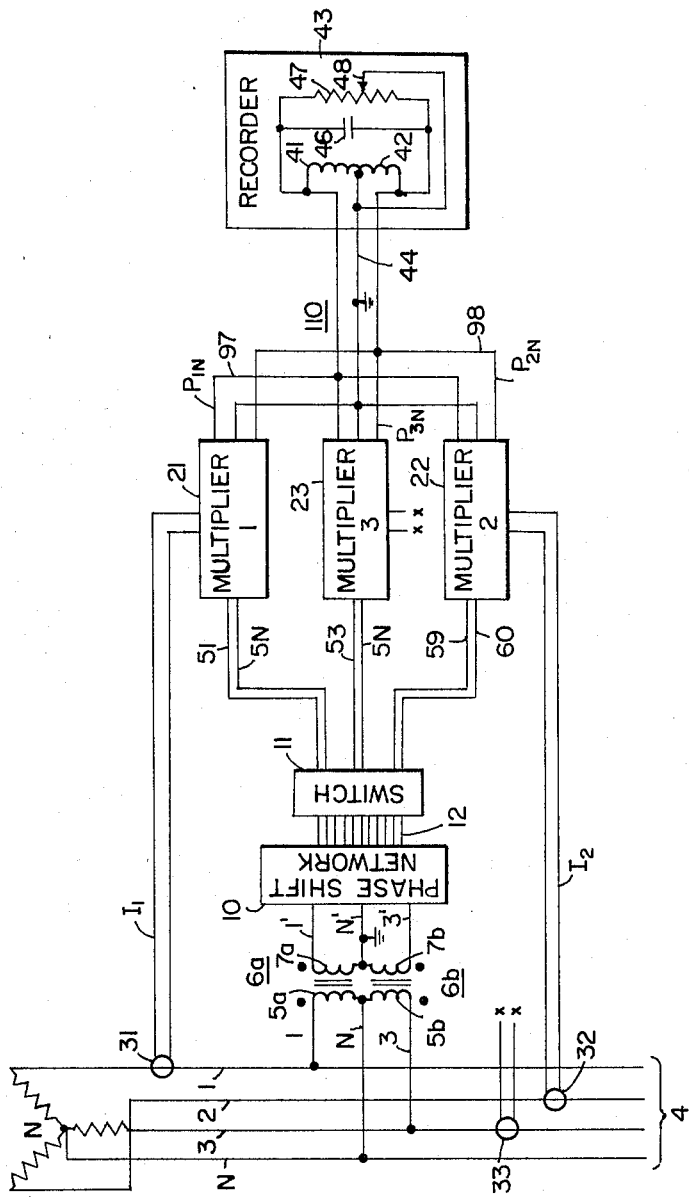
FIG. 1 is a schematic drawing partially in block diagram form illustrating the invention as applied to a three-phase, four-wire system.

Referring to FIG. 1, there is illustrated an arrangement for recording the active and reactive power in a three-phase, four-wire system. The power distribution lines of power distribution system 4 are indicated as 1, 2, 3 and N, respectively, with N indicating the neutral line. Two step-down potential transformers 6a and 6b are provided to obtain two voltages proportional to phase voltages of distribution system 4. The primary windings 5a and 5b of step-down transformers 6a and 6b are respectively connected between lines 1 and N and 3 and N.

The secondary windings 7a and 7b of transformers 6a and 6b provide stepped-down voltages with respect to grounded conductor N' across its output lines 1' and 3', respectively. The instantaneous polarity of the voltages across secondaries 7a and 7b with respect to their corresponding primary is indicated by the dots associated with the primary and secondary windings of each transformer. By way of example, the step-down transformers 6a and 6b may reduce the thirteen kilovolt phase voltage to neutral of the primary windings to 120 volts across each secondary winding.

The voltages on the secondaries 7a and 7b of transformers 6a and 6b are fed through a phase shift network 10 having eleven output connections 12 to the switch and/or coupling network 11 which provides three output voltages. These output voltages 5N–51, 5N–53 and 59–60 are connected to the multiplier circuits 21, 23, and 22, respectively, labeled in FIG. 1 as multiplier 1, multiplier 3 and multiplier 2, respectively. Voltages 5N–51, 5N–53 and 59–60 are proportional to phase voltages 1–N, 3–N, and 2–N, respectively. The voltage 59–60 is generated by phase-shifting transformer arrangement 10, which is proportional to the voltage 2–N, without a voltage connection being made to the high voltage transmission line 2. It is thus noted that only two step-down transformers have to be connected to high voltage distribution system 4 since the third potential is generated by phase-shifting network 10.

Multipliers 21, 23 and 22 are also energized by input currents $I_1$, $I_3$, and $I_2$ obtained through use of hook-on type of current transformers 31, 33 and 32, respectively. Hook-on transformers 31, 32 and 33 are each polarized so that input currents $I_1$, $I_2$ and $I_3$ are in phase with their corresponding phase currents in distribution system 4. To simplify the drawing in FIG. 1, the pair of current leads $I_3$ is broken or interrupted at both the output of current transformer 33 and the input of multiplier 23 and correlated by the identifications XX applied to the respective ends of these leads.

Thus, multipliers 21, 23 and 22 each are provided with a current and a voltage input associated with their respective phases of the three-phase distribution line with the phase voltage of phase 2–N being simulated by the transformer 10 and its output 59–60. The operation of the multipliers 21, 23 and 22 which provide direct current output currents $P_{1N}$, $P_{3N}$ and $P_{2N}$, respectively, are described in detail in the prior copending Corson application. It suffices here to say that the magnitude of these currents will be proportional to the power transferred over the three phases of the power distribution system 4.

These currents are connected to the current coils 41 and 42 of the D.-C. milliampere recorder 43. The coils 41 and 42 are connected together at the grounded connection 44 which is common to the central output lead of multipliers 21, 23 and 22. The other ends of the multipliers and the current coils 41 and 42, respectively, are connected together at leads 97 and 98, respectively. The current coils 41 and 42 are connected such that the magnetomotive force produced thereby and the resultant deflection of the recorder or indicator pointer (not shown) is proportional to the sum of the output currents $P_{1N}$, $P_{3N}$ and $P_{2N}$ provided by the multipliers 21, 23, and 22. Thus, the recorder indicates the power transferred by the three phases of the power distribution system 4. Through switches (not shown) the outputs of multipliers 21, 23 and 22 may be selectively coupled to the recorder 43 to selectively indicate either system or phase power.

Shunting the current coils 41 and 42 of recorder 43 is a filter capacitor 46 and a potentiometer 47. The arm or wiper 48 of the potentiometer 47 is connected to ground lead 44. The capacitor 46 serves to bypass high frequency current fluctuations from the current coils 41 and 42 to minimize recorder output fluctuations or jitter, while the potentiometer 47 functions as a balance adjustment. The indicator 43 could, of course, be any suitable type of electric instrument indicator rather than a recorder, or could be part of a power or other control system.

Figure 2:
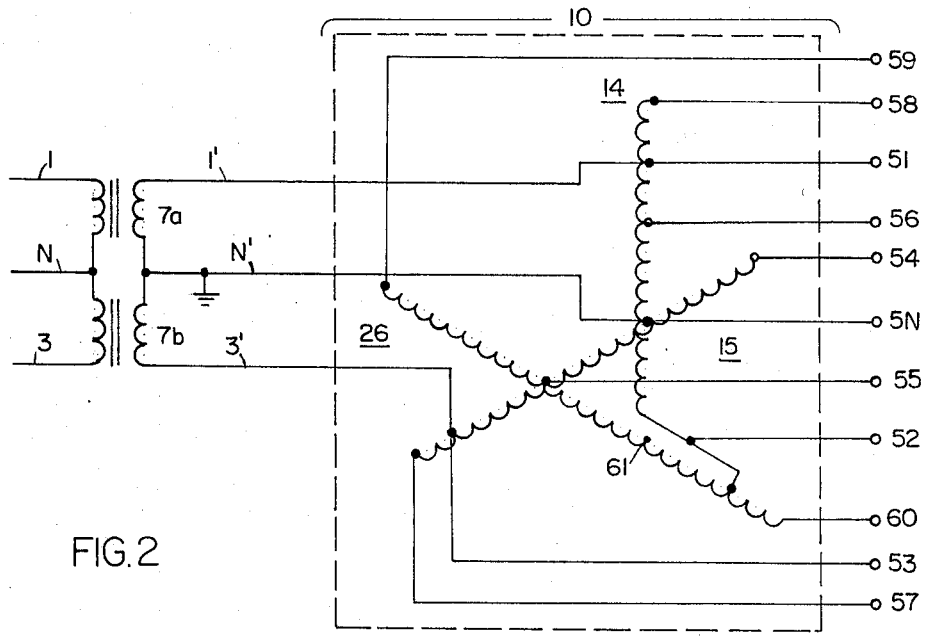
FIG. 2 shows in schematic form the details of the phase-shifting transformer arrangement of FIG. 1.

The details of the phase shift network 10 are shown in schematic form in FIG. 2. Referring to FIG. 2, it will be seen that the circuit includes a first, second and third autotransformer identified as 14, 16 and 15, respectively. Each of these autotransformers includes three intermediate taps such that, for example, the transformer winding 14 having ends indicated as 58 and 52 is tapped adjacent end 58 at tap 51 and adjacent end 52 at tap 5N. A tap 56 is positioned intermediate 51 and 5N and, while not a center tap of transformer 14, may be regarded as the centrally located tap.

Transformer windings 15 and 16 are similar to transformer winding 14 and include end taps 57 and 54 of transformer 15, and end taps 60 and 59 of transformer 16 which correspond to end taps 58 and 52 of transformer 14. The tap adjacent end 54 of transformer 15 which corresponds to tap 5N of transformer 14 is connected to tap 5N of transformer 14 forming a first common or neutral connection 5N. The tap adjacent end 57 of transformer 15 is identified as 53, while the centrally located tap of transformer 15 is identified as 55.

Transformer 16 is connected such that its tap adjacent end 60 is connected to the end tap 52 of transformer 14 forming the second common connection 52, while the tap adjacent end 59 and corresponding to tap 5N of transformer 14 is connected to tap 55 of transformer 15 forming the third common connection 55. The centrally located tap of transformer 16 which is indicated as 61 is not connected to taps on transformers 14 or 15 for reasons which will hereinafter be explained. As indicated in FIG. 2, leads 1', N' and 3' are connected to taps 51, 5N and 53, respectively, of the phase shifting transformer arrangement 10.

The number of turns between various taps on autotransformers 14 are in the following ratios:

| 58–51 | 51–56 | 56–5N | 5N–52 |
|---|---|---|---|
| 19 | 51 | 69 | 69 |

The corresponding taps on autotransformers 15 and 16 have identical ratios. Therefore, if the three autotransformers are connected as in FIG. 2, and potentials, of for example, 120 volts are applied to taps 5N–51 and 5N–53 respectively, then a potential will be created between taps 59–60 which will be of 120 volt magnitude and of the same phase angle as the voltage appearing between line N and 2 in FIG. 1.

It should be noted that end tap 52 of transformer 14 is not connected to centrally located tap 61, but is connected to the tap of transformer 16 adjacent end 60. This is desirable since common autotransformers are not designed for obtaining 120 volt potentials by applying a 69 volt potential (55–52) to its 69 volt winding (55–61) and taking the output across the 120 volt winding (55–52) since this type of operation results in an appreciable phase angle error in the 120 volt potential. To minimize this error, autotransformer 16 was connected as shown in FIG. 2, thus applying the 69 volt potential between tap 52 of transformer 14 and tap 55 of transformer 15, across the 120 volt winding of transformer 16. Since the ratio of 69/120 is identical to the ratio of 120/208, then taps 59–60 of transformer 16 have an output of 120 volts potential. Thus, by maintaining the turns ratio while increasing the efficiency of the transformer, the phase angle error is thereby minimized to an acceptable level.

Figure 5:
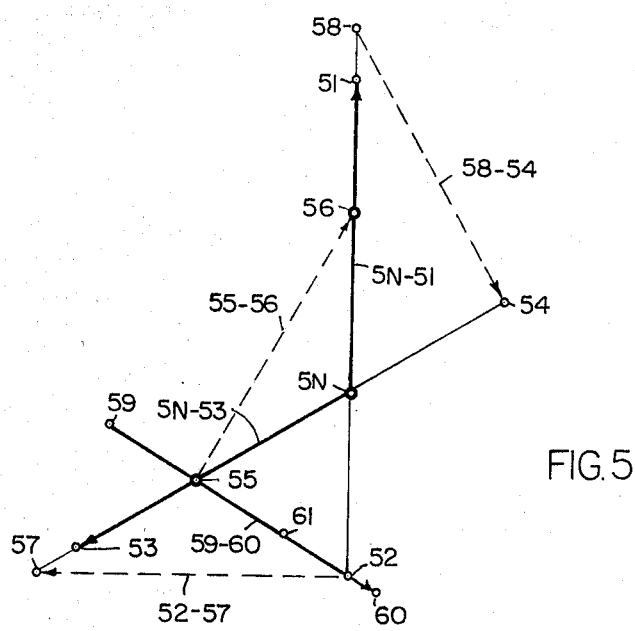

FIG. 5 is a vector diagram of the phase relationship of the in-phase proportional potentials in question, i.e., 5N–51, 5N–53 and 59–60 which are represented by the heavy solid vector lines. These potentials appear between the like-numbered taps of transformers 14, 16 and 15, respectively. The 90° out-of-phase proportional potentials 52–57, 54–58 and 55–56 are represented by dotted lines which begin and terminate on the like-numbered taps of the transformers.

If the distribution line 4 in FIG. 1 is carrying an unbalanced load, the potentials of line N–1 and N–3 and N–2 will not necessarily be equal. Therefore, since the potential seen at 59–60 is a function of the potentials in lines N–1 and N–3, it will not necessarily be of a magnitude proportional to the potential in line N–2. The error, however, is small and results in an error in the total system power of no greater magnitude than that experienced when measuring the total system power by means of the conventional two and one-half element wattmeter previously described.

With the arrangement described above, output potentials which are proportional to the various phase potentials appearing on the power distribution system 4 are provided across the taps indicated in the following table:

TABLE I

| Phase Potential | In-Phase Proportional Potential (Watts) | 90° Phase-Shifted Proportional Potential (Vars) | Fed to Multiplier |
|---|---|---|---|
| 1–N | 5N–51 | 52–57 | 21 |
| 3–N | 5N–53 | 58–54 | 23 |
| 2–N | 59–60 | 55–56 | 22 |

From the above table and reference to FIGS. 2 and 5, it will be seen that the potential between taps 51 and 5N is taken across leads 1' and N' of step-down transformer 6a and is proportional to the phase potential 1–N. The potential between taps 53 and 5N is taken across leads 3' and N' of step-down transformer 6b and is proportional to the phase potential 3–N. However, the potential between taps 59–60, which is proportional to the phase potential 2–N, is generated by the network 10, not by a transformer connection to distribution line 2. The proportional potentials are in phase with their corresponding phase potential of the power transmission system 4 so that when they are multiplied by the respective current inputs by the multipliers 21, 23, and 22 output currents will be provided which are proportional to the real power in the respective phases of the transmission lines.

In order to obtain reactive power or var indications, proportional potentials which have been phase shifted 90° from those utilized for the in-phase or watts measurement are provided. Table I above indicates the proper taps of arrangement 10 which provide the phase shifted proportional potentials for use in the multipliers 21, 23, and 22. These phase-shifted potentials are proportional to the voltages 1–N, 3–N, and 2–N and are obtained between taps 52 and 57, 54 and 58, and 55 and 56, respectively. Reference to FIG. 5 indicates that these potentials are each displaced 90° from a nonphase-shifted potential and of the same magnitude.

Thus, multipliers 21, 23, and 22 may be supplied with proportional phase potentials which are either in phase or 90° out of phase with the respective current inputs supplied thereto in order to provide multiplier output currents which are proportional to real power or watts, or reactive power, or vars, respectively. The connections shown in FIG. 1 to the input of the multipliers 21, 23 and 22, are by way of example, those taps from switch 11 which provide real power or watt indications. However, connections in accordance with the third column of Table I will provide the necessary phase shift and indications of reactive power or vars.

Since it is often desirable to obtain measurements of both the active and reactive power at a given location in the power distribution system to determine, among other things, the phase angle between the voltage and the current of the various lines or phases, it is desirable to provide switching means in the equipment which may be safely and readily activated while the equipment described above is connected to the transmission lines 1, 2, 3 and N.

Figure 3:
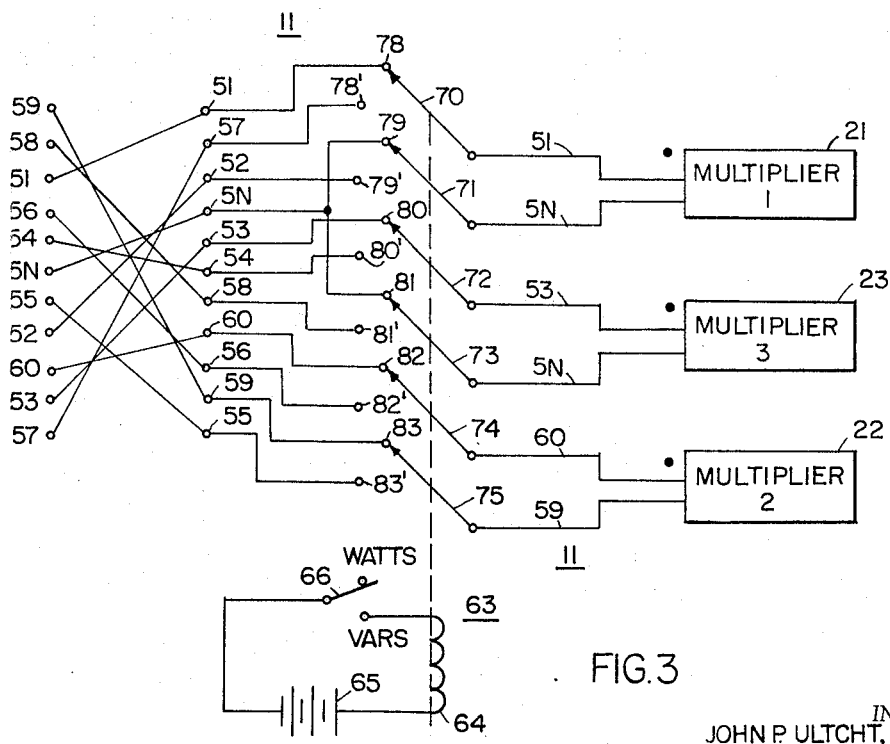
FIG. 3 shows in schematic form the details of the switching circuits suitable for use in the system of FIG. 1 for selectively providing active or reactive power indications.

An example of such a switching arrangement is shown in FIG. 3. This arrangement selectively provides active and reactive power measurements without changing the electrical connections to the distribution lines. It will be seen that the selective switching circuit is operated by relay 63, coil 64 of which is in series with D.-C. source 65 and selector switch 66. Switch 66 is shown in the open or "watts" position so that relay 63 is unenergized and the six poles or arms 70, 71, 72, 73, 74 and 75 are respectively connected to contacts 78, 79, 80, 81, 82 and 83 to interconnect taps 51 and 5N to multiplier 1, 53 and 5N to multiplier 3, and 60 and 59 to multiplier 2. The operation of switch 66 energizes relay coil 64 to move the poles or arms 70–75 to contacts 78' through 83', respectively, to which taps 57, 52, 54, 58, 56 and 55 are respectively connected. Such connections are in accordance with the reactive power or vars connections of Table I with taps 52 and 57 connected to multiplier 21, taps 54 and 58 connected to multiplier 23, and taps 55 and 56 connected to multiplier 22.

The multipliers 21, 23 and 22 each may be of the general configuration described in the copending patent application, Ser. No. 80,077 of Almon J. Corson, filed January 3, 1961, now Patent No. 3,218,554, entitled, "Electrical Instrument Transducer," and assigned to the same assignee as the subject application.

Figure 4:
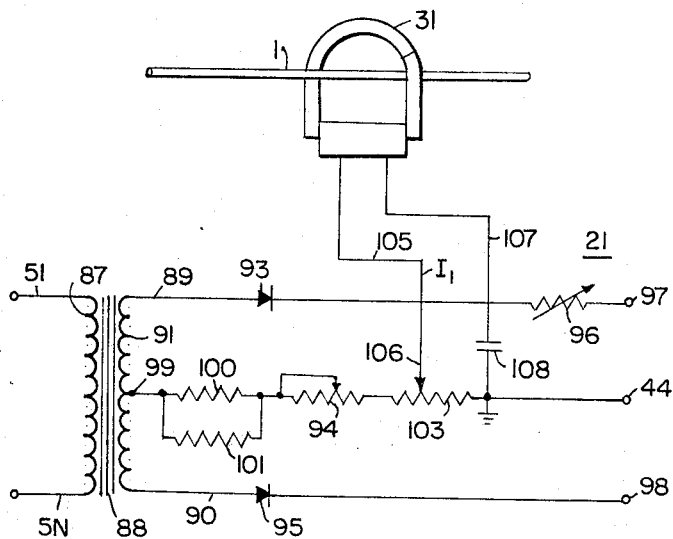
FIG. 4 shows in schematic form the details of suitable hook-on watt-var transducers or multipliers shown in block diagram form in FIGS. 1 and 3; and, FIG. 5 is a plot of in-phase and 90 degrees out-of-phase voltages which are proportional to the three phases of the power distribution system.

Referring to FIG. 4, there is shown a multiplier or transducer 21 in accordance with the teachings of the aforesaid Corson application and suitable for use in the subject invention. Reference may be had to that application for a more detailed description of the construction details, theory, and operation of such a multiplier transducer. The potential input provided by the output of the transformer 10 and switching arrangement 11 is connected to the primary 87 of the 1 to 1 ratio coupling transformer 88. When the relay 64 is unenergized as shown in FIG. 3, transformer taps 51 and 5N are connected to the primary of the transformer. The ends 89 and 90 of the center tapped secondary 91 of transformer 88 are connected through diode 93 and diode 95, respectively, to the output leads 97 and 98. The center tap 99 of the transformer secondary 91 is connected through a series circuit including a shunt combination of nonlinear silicon carbide resistor 100 and linear resistor 101 and potentiometers 94 and 103 to the grounded output lead 44.

The current input to the multiplier 21 is provided by the hook-on current transformer 31 surrounding distribution line 1 to supply the current $I_1$ through lead 105 to the arm or wiper 106 of the range potentiometer 103 and through lead 107 in series with capacitor 108 to the grounded terminal or output lead 44.

The magnitude of the current appearing at the output leads 97, 44 and 98 and supplied to the summing circuit 110 in the input of the recorder 43 is proportional to the power flow through the phase 1–N of the power distribution system 4.

The circuit configurations of the multipliers 23 and 22 are the same as that of multiplier 21 shown in FIG. 4 and the proper relative magnitude of currents supplied by each multiplier to the summing circuit 110 may be adjusted through selective adjustment of potentiometers 94. Zero adjust potentiometer 96 is also provided in each multiplier to provide adjustment for circuit balance; i.e., with a potential applied to its input and no current input applied to potentiometer 103, the currents in lines 97 to 44 and 98 to 44 are adjusted to be equal so that recorder 43 will not be deflected from zero when no current signal is present.

Thus, the recorder or indicator 43 may be utilized to selectively provide an indication and/or record of the polyphase active or reactive power flowing over the power distribution line.

While the arrangement described above utilizes by way of example potential input connection from neutral line N and lines 1 and 3, neutral and lines 1 and 2, or neutral and lines 2 and 3 could similarly be utilized.

It is appreciated that maximum accuracies result if the phase potentials of the power transmission system 4 are balanced, but suitable accuracies have been realized with power systems having a reasonable amount of unbalance.

While there have been described what are at present considered to be preferred embodiments of the invention, it will be apparent to those skilled in the art that various changes and modifications may be made therein without departing from the spirit or scope of the invention.

What I claim as new and desire to secure by Letters Patent of the United States is:

1. An electrical measuring system for obtaining three voltages which are representative of, and in phase with, the potentials existing in a three-phase, four line distribution system comprising,
   first transformation means connected to the neutral line and the first line for obtaining a first voltage proportional to and in phase with the voltage between said neutral line and said first line,
   second transformation means connected to the neutral line and the second line for obtaining a second voltage proportional to and in phase with the voltage between said neutral line and said second line,
   means connected to said first and second transformation means and responsive to said first and second proportional voltages for generating a third voltage proportional to and in phase with the voltage between said neutral line and the third line, and utilization means connected to said generating means for measuring said first, second, and third voltages.

2. The combination of claim 1 in which said generating means comprises first, second and third multitapped autotransformers interconnected at certain of said taps to form a delta connection therebetween having a first or neutral, second and third common connections at the vertices thereof, means for applying said first proportional voltage between said neutral connection and a tap on said first autotransformers, means for applying said second proportional voltage between said neutral connection and a tap on said second autotransformers, said third proportional voltage being generated between taps on said third autotransformers, and coupling means connecting said utilization means to said first, second, and third multitapped autotransformers.

3. An electrical measuring system for obtaining system active power in a three-phase, four-line power distribution system comprising:

first means connected to the neutral line and the first line for obtaining a first voltage proportional to and in phase with the voltage between said neutral line and said first line, second means connected to the neutral line and the second line for obtaining a second voltage proportional to and in phase with the voltage between said neutral line and said second line, means connected to said first and second means and responsive to said first and second proportional voltages for generating a third voltage proportional to and in phase with the voltage between said neutral line and the third line, means inductively coupled to said first, second and third lines for providing first, second and third currents which are proportional to the currents flowing in said first, second and third lines, respectively, and means for individually multiplying by corresponding ones of said proportional currents and proportional voltages for individually providing signals proportional to active power in each circuit of said three-phase system.

4. The combination of claim 3 further comprising means for summing said signals representative of active power in each circuit to provide system active power.

5. The combination of claim 3 in which said generating means provides fourth, fifth and sixth voltages which are respectively 90° out of phase with the voltages on said first, second and third lines with respect to said neutral line.

6. The combination of claim 5 further comprising means for selectively connecting either said proportional in-phase voltages or said proportional out-of-phase voltages to said multiplying means so that each of said proportional voltages, when selected, will be multiplied by the corresponding one of said proportional currents to provide signals representative of active or reactive power in each circuit of said three-phase system.

7. The combination of claim 6 further comprising means for summing said signals which are representative of circuit active or reactive power to provide system active or reactive power.

8. An electrical measurement circuit for use on three-phase, four-line power systems including three lines plus a neutral line comprising:

a first, second, and third multitapped autotransformer interconnected at certain of said taps to form a delta connection therebetween having a first or neutral, second, and third common connected at the vertices thereof, means to connect two of said power system lines and said neutral line as the inputs to said interconnected transformers to apply potentials thereto which are proportional to the potentials of two of the phases of said power system relative to said neutral line, said neutral connection being connected to said first or neutral common connection of said delta and the other two inputs being connected to taps not common to said delta on the autotransformers forming said neutral connection therebetween, a plurality of output connections from said interconnected transformers and the input thereto to provide three in-phase potentials proportional to the potentials of all three phases of said power system relative to neutral, three of said output connections being connected to the said three input connections to provide two potentials which are proportional to the potential of two phases of said power system relative to neutral, two other of said output connections being connected to taps on the autotransformer not connected to form said neutral connection to provide a voltage proportional to the third phase potential relative to neutral of the line not connected to said input, said interconnected autotransformers also providing three phase-shifted potentials which are proportional to and 90° out of phase with the phase potentials of said power system relative to neutral, the first of said phase-shifted potentials being provided between the second common delta connection and a tap on the autotransformer not connected to form the second common delta connection, the second of said phase-shifted potentials being similarly provided between the third common delta connection and a tap on the autotransformer not connected to form the third common delta connection, and the third of said phase-shifted potentials being provided between taps of the two autotransformers which are respectively connected at other taps to form the neutral common delta connection.

9. An electrical measurement circuit for use on three-phase, four-line power systems including three lines plus a neutral line comprising:

a first, second, and third multitapped autotransformer interconnected at certain of said taps to form a delta connection therebetween having a first or neutral, second, and third common connection at the vertices thereof, means to connect two of said power system lines and said neutral line as the inputs to said interconnected transformers to apply potentials thereto which are proportional to the potentials of two of the phases of said power system relative to said neutral line, said neutral connection being connected to said first or neutral common connection of said delta and the other two inputs being connected to taps not common to said delta on the autotransformers forming said neutral connection therebetween, a plurality of output connections from said interconnected transformers and the input thereto to provide three in-phase potentials proportional to the potentials of all three phases of said power system relative to neutral, three of said output connections being connected to the said three input connections to provide two potentials which are proportional to the potential of two phases of said power system relative to neutral, two other of said output connections being connected to taps on the autotransformer not connected to form said neutral connection, to provide a voltage proportional to the third phase potential relative to neutral of the line not connected to said input, said interconnected autotransformers also providing three phase-shifted potentials which are proportional to and 90° out of phase with the phase potentials of
said power system relative to neutral,
the first of said phase-shifted potentials being provided
between the second common delta connection and a
tap on the autotransformer not connected to form
the second common delta connection,
the second of said phase-shifted potentials being similarly provided between the third common delta connection and a tap on the autotransformer not connected to form the third common delta connection,
and the third of said phase-shifted potentials being provided between taps of the two autotransformers which are respectively connected at other taps to form the neutral common delta connection,
means to provide currents proportional to the current flow through the three lines of said power system,
and means to selectively multiply said currents by either their respective in-phase or phase-shifted potentials to provide signals proportional to the active or reactive phase power.

10. An electrical measurement circuit for use on three-phase, four-line power systems including three lines plus a neutral line comprising:
a first, second, and third multitapped autotransformer interconnected at certain of said taps to form a delta connection therebetween having a first or neutral, second, and third common connection at the vertices thereof,
means to connect two of said power system lines and said neutral line as the inputs to said interconnected transformers to apply potentials thereto which are proportional to the potentials of two of the phases of said power system relative to said neutral line,
said neutral connection being connected to said first or neutral common connection of said delta and the other two inputs being connected to taps not common to said delta on the autotransformers forming said neutral connection therebetween,
a plurality of output connections from said interconnected transformers and the input thereto to provide three in-phase potentials proportional to the potentials of all three phases of said power system relative to neutral,
three of said output connections being connected to the said three input connections to provide two potentials which are proportional to the potential of two phases of said power system relative to neutral,
two other of said output connections being connected to taps on the autotransformer not connected to form said neutral connection to provide a voltage proportional to the third phase potential relative to neutral of the line not connected to said input,
said interconnected autotransformers also providing three phase-shifted potentials which are proportional to and 90° out of phase with the phase potentials of said power system relative to neutral,
the first of said phase-shifted potentials being provided between the second common delta connection and a tap on the autotransformer not connected to form the second common delta connection,
the second of said phase-shifted potentials being similarly provided between the third common delta connection and a tap on the autotransformer not connected to form the third common delta connection,
the third of said phase-shifted potentials being provided between taps of the two autotransformers which are respectively connected at other taps to form the neutral common delta connection,
means to provide currents proportional to the current flow through the three lines of said power system,
means to selectively multiply said currents by either their respective in-phase or phase-shifted potentials to provide signals proportional to the active or reactive phase power,
and means responsive to said proportional signals for selectively providing indications of active or reactive power.

11. An electrical measurement circuit for use on three-phase, four-line power systems including a neutral line comprising:
a first, second, and third multitapped autotransformer interconnected at certain of said taps to form a delta connection therebetween having a first or neutral, second, and third common connection at the vertices thereof,
means to connect two of said power system lines and said neutral line as the inputs to said interconnected transformers to apply potentials thereto which are proportional to the potentials of two of the phases of said power system relative to said neutral line,
said neutral connection being connected to said first or neutral common connection of said delta and the other two inputs being connected to taps not common to said delta on the autotransformers forming said neutral connection therebetween,
said interconnected autotransformers providing three phase-shifted potentials which are proportional to and 90° out of phase with the phase potentials of said power system relative to neutral,
the first of said phase-shifted potentials being provided between the second common delta connection and a tap on the autotransformer not connected to form the second common delta connection,
the second of said phase-shifted potentials being similarly provided between the third common delta connection and a tap on the autotransformer not connected to form the third common delta connection,
the third of said phase-shifted potentials being provided between taps of the two autotransformers which are respectively connected at other taps to form the neutral common delta connection.

12. An electrical measurement circuit for use on three-phase, four-line power systems including a neutral line comprising:
a first, second, and third multitapped autotransformer interconnected at certain of said taps to form a delta connection therebetween having a first or neutral, second, and third common connection at the vertices thereof,
means to connect two of said power system lines and said neutral line as the inputs to said interconnected transformers to apply potentials thereto which are proportional to the potentials of two of the phases of said power system relative to said neutral line,
said neutral connection being connected to said first or neutral common connection of said delta and the other two inputs being connected to taps not common to said delta on the autotransformers forming said neutral connection therebetween,
said interconnected autotransformers providing three phase-shifted potentials which are proportional to and 90° out of phase with the phase potentials of said power system relative to neutral,
the first of said phase-shifted potentials being provided between the second common delta connection and a tap on the autotransformer not connected to form the second common delta connection,
the second of said phase-shifted potentials being similarly provided between the third common delta connection and a tap on the autotransformer not connected to form the third common delta connection,
the third of said phase-shifted potentials being provided between taps of the two autotransformers which are respectively connected at other taps to form the neutral common delta connection,
means to provide currents proportional to the current flow through the three lines of said power system,
means to combine said currents with their respective phase-shifted potentials to provide signals proportional to the reactive phase power or vars.

13. An electrical measurement circuit for use on three-phase, four-line power systems including three lines plus a neutral line comprising:
   a first, second, and third multitapped autotransformer interconnected at certain of said taps to form a delta connection therebetween having a first or neutral, second, and third common connection at the vertices thereof,
   means to connect two of said power system lines and said neutral line as the inputs to said interconnected transformers to apply potentials thereto which are proportional to the potentials of two of the phases of said power system relative to said neutral line,
   said neutral connection being connected to said first or neutral common connection of said delta and the other two inputs being connected to taps not common to said delta on the autotransformers forming said neutral connection therebetween,
   and a plurality of output connections from said interconnected transformers and the input thereto to provide three in-phase potentials proportional to the potentials of all three phases of said power system relative to neutral,
   three of said output connections being connected to the said three input connections to provide two potentials which are proportional to the potential of two phases of said power system relative to neutral,
   two other of said output connections being connected to taps on the autotransformer not connected to form said neutral connection to provide a voltage proportional to the third phase potential relative to neutral of the line not connected to said input.

14. An electrical measurement circuit for use on three-phase, four-line power systems including three lines plus a neutral line comprising:
   a first, second, and third multitapped autotransformer interconnected at certain of said taps to form a delta connection therebetween having a first or neutral, second, and third common connection at the vertices thereof,
   means to connect two of said power system lines and said neutral line as the inputs to said interconnected transformers to apply potentials thereto which are proportional to the potentials of two of the phases of said power system relative to said neutral line,
   said neutral connection being connected to said first or neutral common connection of said delta and the other two inputs being connected to taps not common to said delta on the autotransformers forming said neutral connection therebetween,
   a plurality of output connections from said interconnected transformers and the input thereto to provide three in-phase potentials proportional to the potentials of all three phases of said power system relative to neutral,
   three of said output connections being connected to the said three input connections to provide two potentials which are proportional to the potential of two phases of said power system relative to neutral,
   two other of said output connections being connected to taps on the autotransformer not connected to form said neutral connection to provide a voltage proportional to the third phase potential relative to neutral of the line not connected to said input,
   means to provide currents proportional to the current flow through the three lines of said power system,
   and means to combine said currents with their respective in-phase potentials to provide signals related to the active phase power or watts.

15. An electrical measurement circuit for use on three-phase, four-line power systems including three lines plus a neutral line comprising:
   a first, second, and third multitapped autotransformer each interconnected to each other to form a delta connection therebetween,
   a first or neutral common delta connection being formed by the junction of said first and third autotransformers, a second common delta connection being formed by the junction of said first and second transformers, and a third common connection being formed by the junction of said second and third transformers,
   each of said autotransformers including a plurality of taps in addition to the pair used for forming said delta connection and formed by extensions of the autotransformers beyond said delta connections,
   means to connect two of said power system lines and said neutral line as the inputs to said interconnected transformers to provide potentials thereto which are proportional to the potentials of two of the phases of said power system relative to said neutral line,
   said neutral line being connected to said first or neutral common connection of said delta, one other of said inputs being connected to one of the additional taps of said first transformer, and the other of said inputs being connected to one of the additional taps of said third transformer,
   and a plurality of output connections connected from said common delta connections and said additional plurality of taps of said autotransformers to a coupling arrangement,
   said coupling arrangement including means to select from said output connections those potentials in phase with and proportional to the three-phase potentials of said three lines relative to said neutral line.

16. An electrical measurement circuit for use on three-phase, four-line power systems including three lines plus a neutral line comprising:
   a first, second, and third multitapped autotransformer each interconnected to each other to form a delta connection therebetween,
   a first or neutral common delta connection being formed by the junction of said first and third autotransformers, a second common delta connection being formed by the junction of said first and second transformers, and a third common connection being formed by the junction of said second and third transformers,
   each of said autotransformers including a plurality of taps in addition to the pair used for forming said delta connection and formed by extensions of the autotransformers beyond said delta connections,
   means to connect two of said power system lines and said neutral line as the inputs to said interconnected transformers to provide potentials thereto which are proportional to the potentials of two of the phases of said power system relative to said neutral line,
   said neutral line being connected to said first or neutral common connection of said delta, one other of said inputs being connected to one of the additional taps of said first transformer, and the other of said inputs being connected to one of the additional taps of said third transformer,
   a plurality of output connections connected from said common delta connections and said additional plurality of taps of said autotransformers to a coupling arrangement,
   said coupling arrangement including means to select from said output connections those potentials in phase with and proportional to the three-phase potentials of said three lines relative to said neutral line,
   said coupling arrangement also including a switch to select from said output connections either said in-phase potentials or three potentials which are 90° phase shifted from and proportional to the potentials appearing across said three lines relative to said neutral line.

17. An electrical measurement circuit for use on three-phase, four-line power systems including three lines plus a neutral line comprising:

a first, second, and third multitapped autotransformer each interconnected to each other to form a delta connection therebetween, a first or neutral common delta connection being formed by the junction of said first and third autotransformers, a second common delta connection being formed by the junction of said first and second transformers, and a third common connection being formed by the junction of said second and third transformers, each of said autotransformers including a plurality of taps in addition to the pair used for forming said delta connection and formed by extensions of the autotransformers beyond said delta connections, means to connect two of said power system lines and said neutral line as the inputs to said interconnected transformers to provide potentials thereto which are proportional to the potentials of two of the phases of said power system relative to said neutral line, said neutral line being connected to said first or neutral common connection of said delta, one other of said inputs being connected to one of the additional taps of said first transformer, and the other of said inputs being connected to one of the additional taps of said third transformer, a plurality of output connections connected from said common delta connections and said additional plurality of taps of said autotransformers to a coupling arrangement, said coupling arrangement including means to select from said output connections those potentials in phase with and proportional to the three-phase potentials of said three lines relative to said neutral line, said coupling arrangement also including a switch to select from said output connections either said in-phase potentials or three potentials which are 90° phase shifted from and proportional to the potentials appearing across said three lines relative to said neutral line, means to provide currents proportional to the current flow through the three lines of said power system, means to selectively multiply said currents by either their respective in-phase or phase-shifted potentials to provide signals proportional to the active or reactive phase power, and means responsive to said proportional signals for selectively providing indications of active or reactive power.

References Cited by the Examiner

UNITED STATES PATENTS

| | | | |
|---|---|---|---|
| 1,188,145 | 6/1916 | Blume | 321—57 |
| 2,565,824 | 9/1951 | Petzinger | 324—107 |

WALTER L. CARLSON, *Primary Examiner.*

RUDOLPH V. ROLINEC, *Examiner.*

J. J. MULROONEY, *Assistant Examiner.*